April 26, 1955 P. H. THORNTON, JR., ET AL 2,706,882
WEED CUTTING ATTACHMENT FOR COMBINES
Filed April 21, 1952 2 Sheets-Sheet 1

Phillip H. Thornton, Jr.
Phillip H. Thornton, III   INVENTORS

BY *signatures*
Attorneys

April 26, 1955   P. H. THORNTON, JR., ET AL   2,706,882
WEED CUTTING ATTACHMENT FOR COMBINES
Filed April 21, 1952   2 Sheets-Sheet 2
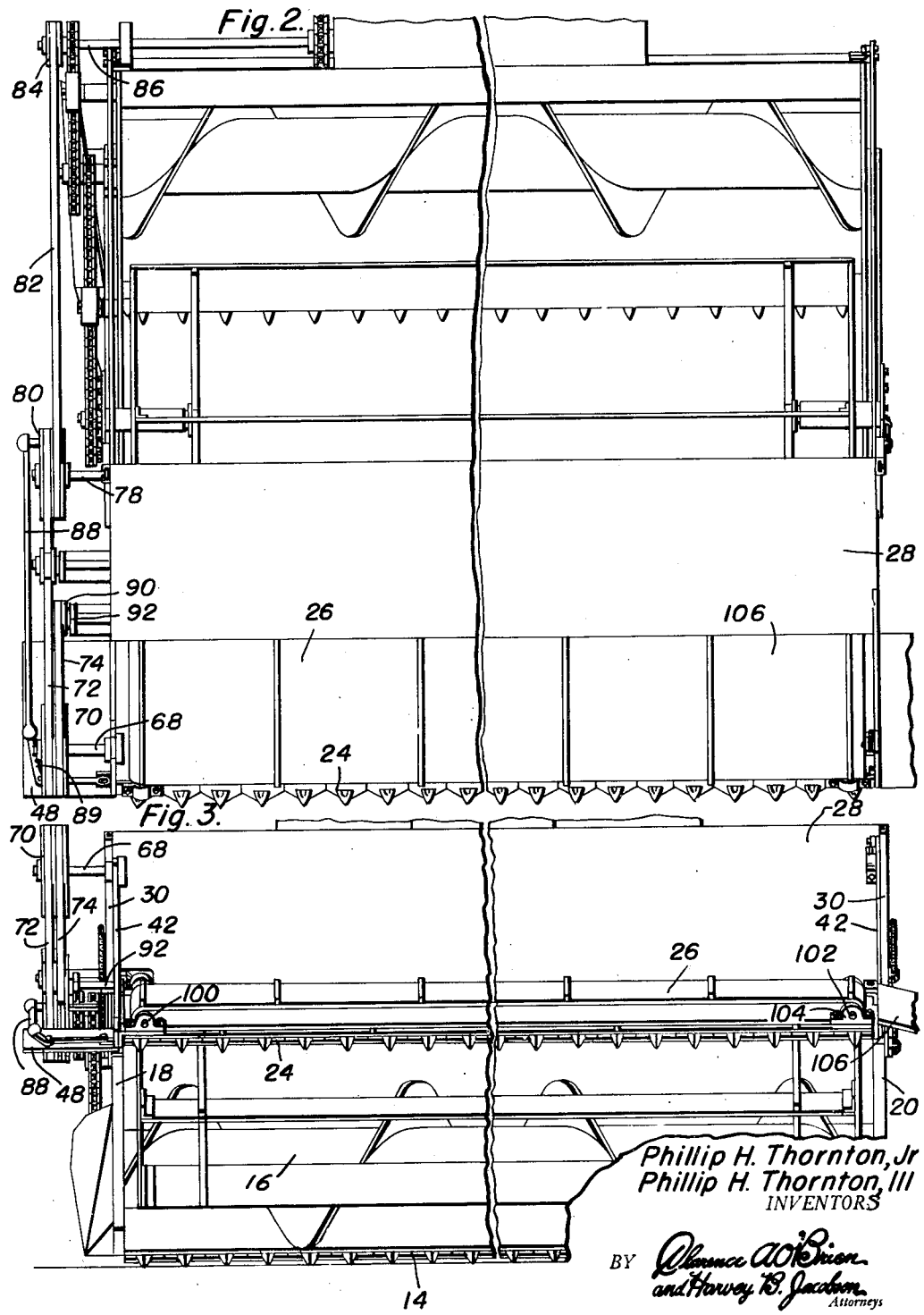

United States Patent Office 2,706,882
Patented Apr. 26, 1955

2,706,882

WEED CUTTING ATTACHMENT FOR COMBINES

Phillip H. Thornton, Jr., Tutwiler, and Phillip H. Thornton III, Webb, Miss., assignors of twenty per cent to Madge S. Thornton, Tutwiler, twenty per cent to Tonya T. Marley, ten per cent to C. S. Carlton, and ten per cent to R. H. Henderson, all of Sumner, Miss.

Application April 21, 1952, Serial No. 283,294

3 Claims. (Cl. 56—23)

This invention comprises novel and useful improvements in a combine attachment and more specifically relates to an auxiliary harvesting device which is adapted to cut the tops of growing vegetation at a predetermined height and which is adapted to be mounted as an attachment upon a conventional harvester combine in advance of the harvesting reel thereof.

In harvesting certain crops, and in particular in torrid or humid localities, it has been found that a serious problem confronts the conventional harvester combine by reason of the growth of weeds in a crop to a height which is often greater than that of the crop and which results in such a dense mass of vegetation as to choke or clog the operation of the conventional harvester, resulting in delays, breakage of the harvester combines, with a resultant increase in the cost of harvesting the crop.

The fundamental purpose of the present invention is to provide an attachment which may be applied to conventional harvester combines for overcoming the above-mentioned difficulty experienced when the vegetation in which the harvester is to be employed is of too great a height.

A more specific object of the invention is to provide a harvesting attachment which may be readily applied to conventional harvester combines in advance of the harvesting reel thereof, and which is so positioned as to cut the tops of vegetation at a predetermined position above the ground and in advance of the main cutter bar and main reel of the harvester combine.

A further important object of the invention is to provide an attachment in conformity with the foregoing objects in which the height of the auxiliary cutter bar and cutter reel with respect to the ground and the crop being harvested may be readily adjusted.

Yet another object of the invention is to provide an attachment in conformity with the foregoing object in which the tops of the vegetation cut by the attachment may be conveyed and discharged to one side of the harvester combine and its attachment.

A still further important object of the invention is to provide an attachment in conformity with the immediately preceding object in which provision is made for preventing the tops of vegetation cut by the attachment from being discharged into the main reel of the harvester.

A still further important object of the invention is to provide a harvester attachment as set forth in the above mentioned objects in which an auxiliary cutter bar, auxiliary reel and a conveyor for the severed tops of vegetation are driven in an improved manner by means carried by the attachment and powered from any convenient source of power of the harvester combine.

These, together with various ancillary features and objects of the invention, which will later become apparent as the following description proceeds, are attained by the present invention, a preferred embodiment of which has been illustrated, by way of example only, in the accompanying drawings, wherein:

Figure 2 is a fragmentary top plan view of the arrangement shown in Figure 1;

Figure 3 is a front elevational view of the arrangement of Figures 1 and 2;

Figure 5:
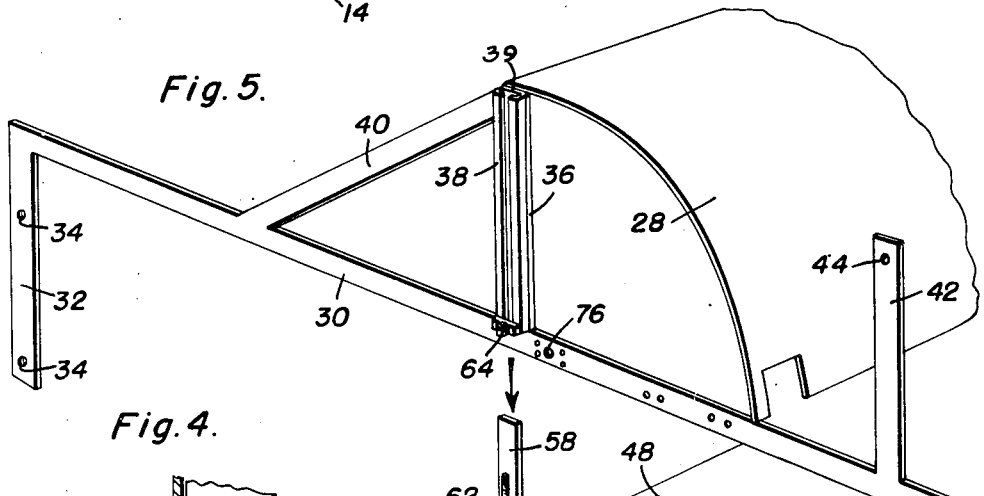
Figure 4:
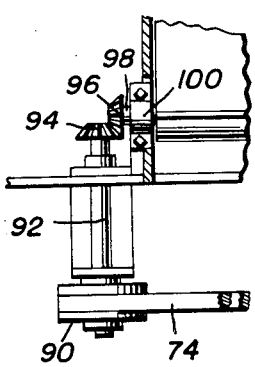

Figure 4 is an enlarged fragmentary detail view, showing in horizontal section a portion of the driving means connecting the conveyor with the secondary reel for driving the former from the latter; and Figure 5 is an enlarged exploded perspective view, part being broken away and omitted, showing certain of the supporting and adjusting means of the attachment and the manner in which a guard member is mounted thereon.

Figure 1:
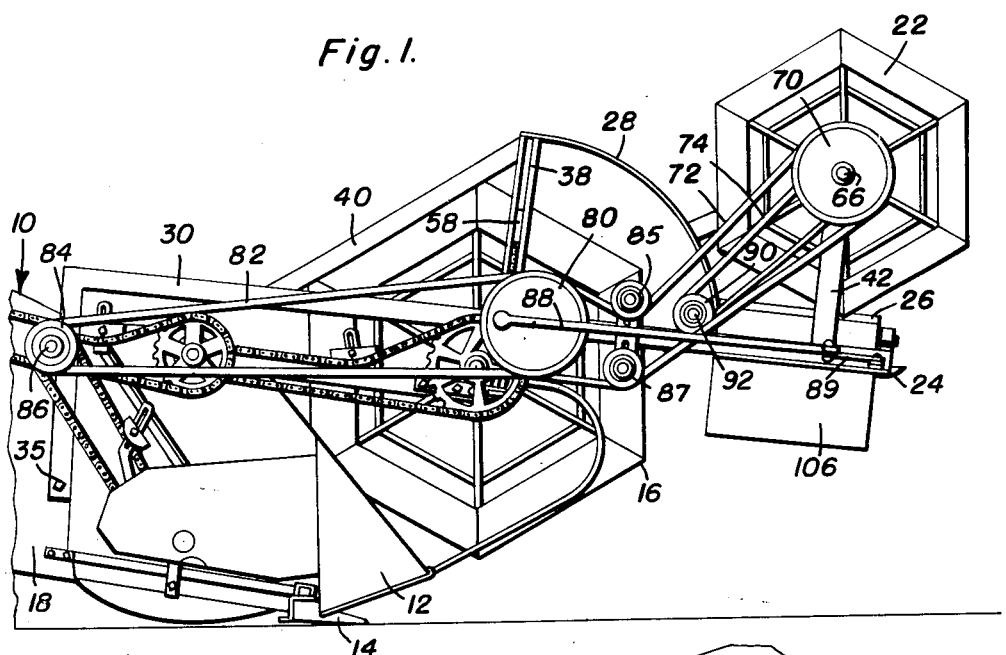
Figure 1 is a side elevational view of a portion of a conventional harvester combine having the combine attachment in accordance with the present invention applied thereto.

Referring now more specifically to the accompanying drawings, wherein like numerals designate similar parts throughout the various views, attention is directed first primarily to Figure 1 wherein the numeral 10 designates generally a harvester combine of any conventional and known type, but which is provided with a suitable combine frame, a portion of which is shown at 12, and which has the customary combine cutter bar 14 and combine reel 16, hereinafter referred to as the main cutter bar and main reel. As shown more clearly in Figure 3, the combine frame 12 has a pair of sides 18 and 20 which are utilized in accordance with this invention to support the combine attachment in the manner set forth hereinafter.

The combine attachment disclosed herein comprises a secondary reel 22, a secondary cutter bar 24, and a conveyor 26 which are mounted upon a suitable supporting framework and are positioned forwardly of the main reel 16 and are elevated above the main cutter bar 14 at a predetermined position above the ground in order to sever the tops of vegetation at a desired height. In addition to the above mentioned elements, the attachment further includes a guard member 28 which is so positioned as to prevent the vegetation tops severed by the combine attachment from being discharged into the main reel 16 of the harvester combine.

A support means is provided for removably and adjustably mounting the attachment upon the side walls of the frame of the harvester combine. This supporting means consists of a pair of levers or arms 30 each of which, at its inner or rearward end, has a downwardly extending projection 32 which is apertured as at 34 whereby the same may be secured as by bolts or the like 35 to the sides 18 and 20 of the combine frame 12. Intermediate their ends, these levers 30 are provided with upstanding vertical members 36 which are either formed with or have rigidly attached to their outer sides vertically disposed channel members 38 constituting guides, for a purpose to be subsequently set forth. An inclined brace member 40 is integrally attached to the members 38 and the levers 30, and serves to rigidly brace the same.

The previously mentioned guard 28 which extends transversely across the entire attachment and combine consists of a plate which is curved transversely of its length, and at its lower edge rests upon or is fixedly secured as by welding at 39 or other suitable means to the levers 30, and at its upper edge is fixedly secured to the upper end of the member 36. The member 36 thus serves to brace and rigidly support the upper portion of the arcuately shaped, transversely extending guard 28.

Adjacent its forward or outer end, the levers 30 are provided with upstanding brackets 42 which are apertured at their upper ends, as at 44. At their outer extremities, the levers 30 are provided with elongated slots 46, and supporting plates 48 are integrally or rigidly connected to the outer ends of the levers 30 and extend laterally outwardly therefrom. These plates are each provided with an aperture 50 for a purpose to be subsequently set forth.

An L-shaped supporting and adjusting bracket 52 is provided for each of the levers 30, each of these brackets consisting of a base leg 54 which is apertured, as at 56, for attachment in any suitable manner as by welding, bolting or the like, not shown, to the sides 18 and 20 of the frame of the combine or to any conventional brackets or elements carried thereby, the bracket further having an upstanding arm 58 which is slidably received in the above-mentioned channel member 38 which constitutes a guide, slidable upon the arm 58, for vertically adjusting the lever relative thereto.

Rotatably journaled and carried by a suitable boss 60 upon the base 54 of the bracket 52 is a vertically disposed adjusting screw 62 which is receivable through an internally screw-threaded lug 64 mounted upon the bottom portion of the channel member 38. By means of the screw and lug, it will be evident that when the end portion 32 of the lever 30 is secured by a single fastener through one of the apertures 34, the levers 30 may be raised or lowered to thus vertically adjust the various elements carried thereby.

It will be observed that the guard member 28 is curved over and disposed over the main reel 16 so as to prevent passage of material cut by the secondary reel 22 from passing into the main reel.

The upstanding arms 42, by means of the apertures 44, serve to journal the axle 66 of the secondary reel 22. Secured to the end of this axle, as by a stub shaft 68 which may be integral with the axle, is a double pulley 70 to which is connected a belt 72 by which the secondary reel is driven, as set forth hereinafter, and a belt 74 by which the conveyor 26 is driven as set forth hereinafter.

Journaled in an aperture 76, see Figure 5, is an axle 78 having a double pulley 80 thereon which constitutes the driving pulley for the elements carried by the combine attachment. This driving pulley is connected by a belt 82 with a pulley 84 carried by a shaft 86 forming a conventional part of the harvester combine and which serves as a part of the power supplying system for the instrumentalities of the combine. The double pulley 80 is further connected by the above mentioned belt 72 to the double pulley 70 for driving the latter, the belt 72 being entrained over a pair of idler or adjusting pulleys 85 and 87 of a conventional character.

Connected to the double pulley 80 is a connecting rod or pitman 88 which in turn is operatively connected, through a bellcrank 89 pivoted to the plate 48 through the hole 50, in a conventional manner to the secondary cutter bar for operating the same, the cutter bar slidingly extending through the slot 46 for engagement by the bellcrank 89. It will thus be apparent that the secondary reel and the secondary cutter bar are both operated by the driving pulley 80, the latter in turn being driven from one of the power shafts of the combine.

The belt 74 is connected to a pulley 90 upon a stub axle 92, see also Figure 4, which is provided with a bevel gear 94 enmeshed with a similar bevel gear 96 carried by the elevator power shaft 98 which is journaled in suitable bearing brackets 100 carried by the levers 30. A similar axle 102 is journaled in brackets 104 and the above-mentioned conveyor belt 26 is entrained thereover. It will thus be apparent that the conveyor is driven directly from the secondary reel and simultaneously therewith.

At the opposite side of the attachment from that carrying the above-mentioned power driving connections, there is provided adjacent the discharge end of the conveyor 26 a downwardly inclined apron 106 which serves to discharge the material deposited upon and carried by the conveyor to one side of the attachment and combine whereby the same will be out of the way of the main reel and cutter bar during forward travel of the combine.

From the foregoing, it will be apparent that there has been provided an attachment which may be easily applied to conventional harvester combines; when so applied may be relatively adjusted vertically with respect to the combine reel and cutter bar; which provides a guard preventing the topped portion of the crop from being thrown into the combine reel; and which delivers the material cut by the attachment to one side of the combine. In addition, a convenient and improved driving connection is afforded between the various elements of the attachment and the power system of the combine for operating the attachment in synchronization with the combine.

Since, from the foregoing, the construction and advantage of this combine attachment are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. An attachment for a harvesting combine of the type having a frame with a main cutter bar and a main harvester reel mounted thereon and with a power operating mechanism for the cutter bar and reel; which attachment comprises support means adapted to be secured to the opposite sides of a combine frame, a secondary cutter bar and a secondary harvester reel mounted on said support means and disposed forwardly of the main reel and above the main cutter bar for topping vegetation at a predetermined height in advance of the main cutter bar and reel, a conveyor on said support means and extending transversely thereof and positioned rearwardly of said secondary cutter bar and below said secondary reel and movable to discharge vegetation cut by said attachment to one side of the latter, means mounted on said support means adapted to drive said secondary cutter bar and reel and said conveyor from the power operating mechanism of the combine, said support means comprising a pair of levers, each of said levers having one end adapted for attachment to the side of a combine frame and having an adjusting bracket intermediate its ends and adapted for attachment to the side of a combine, said adjusting bracket being connected to said levers for vertically adjusting the other end of the same, said secondary cutter bar and reel and its conveyor being carried by said other ends of said levers.

2. An attachment for a harvesting combine of the type having a frame with a main cutter bar and a main harvester reel mounted thereon and with a power operating mechanism for the cutter bar and reel; which attachment comprises support means adapted to be secured to the opposite sides of a combine frame, a secondary cutter bar and a secondary harvester reel mounted on said support means and disposed forwardly of the main reel and above the main cutter bar for topping vegetation at a predetermined height in advance of the main cutter bar and reel, a conveyor on said support means and extending transversely thereof and positioned rearwardly of said secondary cutter bar and below said secondary reel and movable to discharge vegetation cut by said attachment to one side of the latter, means mounted on said support means adapted to drive said secondary cutter bar and reel and said conveyor from the power operating mechanism of the combine, a guard plate extending transversely of said support means and disposed between said main reel and the secondary cutter bar, reel and conveyor, brackets adapted to be mounted fixedly upon each side of a combine frame, said support means comprising levers adapted to be secured to the sides of a combine frame, each lever having a guide slidingly embracing one of said brackets, means for adjustably securing each of said brackets in a guide.

3. An attachment for a harvesting combine of the type having a frame with a main cutter bar and a main harvester reel mounted thereon and with a power operating mechanism for the cutter bar and reel; which attachment comprises support means adapted to be secured to the opposite sides of a combine frame, a secondary cutter bar and a secondary harvester reel mounted on said support means and disposed forwardly of the main reel and above the main cutter bar for topping vegetation at a predetermined height in advance of the main cutter bar and reel, a conveyor on said support means and extending transversely thereof and positioned rearwardly of said secondary cutter bar and below said secondary reel and movable to discharge vegetation cut by said attachment to one side of the latter, means mounted on said support means adapted to drive said secondary cutter bar and reel and said conveyor from the power operating mechanism of the combine, a guard plate extending transversely of said support means and disposed between said main reel and the secondary cutter bar, reel and conveyor, brackets adapted to be mounted fixedly upon each side of a combine frame, said support means comprising levers adapted to be secured to the sides of a combine frame, each lever having a guide slidingly embracing one of said brackets, means for adjustably securing each of said brackets in a guide, said guides comprising support braces secured to the upper portions of said guard.

References Cited in the file of this patent

UNITED STATES PATENTS

| 21,343 | Kaufmann | Aug. 31, 1858 |
| 1,509,124 | Bloor | Sept. 23, 1924 |
| 1,905,409 | Innes | Apr. 25, 1933 |
| 1,905,410 | Innes | Apr. 25, 1933 |